Feb. 28, 1956     J. R. OISHEI ET AL     2,736,053

WINDSHIELD WIPER CARRYING ARM

Filed May 29, 1953

INVENTOR.
John R. Oishei
and William C. Riester

BY: Beau, Brooks, Buckley & Beau,
ATTORNEYS.

United States Patent Office 2,736,053
Patented Feb. 28, 1956

2,736,053
WINDSHIELD WIPER CARRYING ARM

John R. Oishei, Buffalo, and William C. Riester, Eggertsville, N. Y., assignors to Trico Products Corporation, Buffalo, N. Y.

Application May 29, 1953, Serial No. 358,434

11 Claims. (Cl. 15—255)

This invention relates to the windshield cleaning art and more particularly to the wiper carrying arm of a windshield cleaning mechanism by which the wiper is caused to oscillate across the field of vision through the windshield. The wiper carrying arm of the present day windshield cleaner for automobiles embodies a spring for urging its wiper against the windshield under an optimum pressure of approximately six or seven ounces.

Under high-speed driving conditions it has been found, in particular, that where certain cross wind currents are encountered, the heavy wind pressure, which on curved glass windshields divides at the center of the shield and flows both to the right and left, tend to lift the blade as it is moved from the outside inwardly toward the center of the shield. Any attempt to correct this lifting tendency by increasing the spring pressure will cause the rubber lip of the wiping blade to not only wear rapidly but would also cause the lip to bend and take a set during periods of idleness and thereby impair the efficiency of the wiper. Further, a heavier spring pressure will impose an abnormal load upon the windshield cleaner for normal driving.

The primary object of this invention is to provide a windshield wiper carrying arm having plural, definite tensioning adjustments for the purpose of selectively giving optional greater arm tension on the occasions when cars may be required to be operated at exceptionally high speed, as on thruways or in extraordinary heavy weather.

For the specific purpose of providing abnormally heavy or extra pressure to hold the blade on the glass under high-speed driving conditions, means are provided herein whereby the arm pressure may be changed optionally and of a predetermined factory-prescribed character and without employing any mechanical skill or tools to achieve this aim. Herein, two predetermined adjustments are comprehended, such dual tensioning provision enabling the car user to quickly and without mechanical adjustment or effort restore the orginally preset normal tension which is sufficient for ordinary driving purposes. This has the further advantage of permitting the operation of the blade advantageously in very light rains when the shield is not fully wetted by avoiding the imposition of too heavy drag on the wiping rubber element of the blade. It is therefore apparent that relief from the heavier arm pressure is expeditiously obtained with the advantage in preventing extraordinary wear on the blade rubber and a premature bending or folding of the wiping edge and a subsequent set of the same when the blade is in the parked position.

In following the teaching of the present invention, a normal pressure, such as six or seven ounces, is provided for the ordinary driving condition, which pressure can be stepped up by means of a control button provided for the purpose, to provide an increased arm pressure on the blade, such as nine or ten ounces. Any desired variation can be achieved by changing the initial spring tension used in the arm. Whatever this spring tension may be normally in the working position of the arm, the increase in arm pressure is forthcoming by shifting the position with respect to the pivotal connection between the wiper arm sections. This is accomplished by providing a shiftable spring anchorage in the form of an anchoring shoulder pin which at all times is held in its desired fixed relationship, either inwardly or outwardly, by the force applied by the tension spring. To effect the change from the normal spring tension, the operator is only required to press the control button, which is preferably exposed for finger-touch response. This action produces a shift in the line of spring force and an increase in the effective leverage through which the spring will act to increase the mechanical advantage. To relieve the extra tension and restore the normal tension for normal driving speed of the vehicle, the operator is only required to lift the blade off the glass a predetermined distance of some few inches. This action restores the spring-carrying pin to its normal lighter load-carrying position.

It is therefore a further object of the invention to provide a practical blade-carrying arm that will permit, at the car operator's option, a selectivity of arm pressures, one for normal driving having an approximate 6½ oz. arm pressure and the other for unusual driving conditions having a greater arm pressure. By this means the arm pressure may be regulated for particular kinds of weather. The arm is especially effective for winter driving where cars are equipped with specially designed windshield wiper blades designed to eliminate snow-pack. These blades present a greater "sail" area than normal blades on which the wind currents may act with a lifting tendency, and in using such blades, it has been found desirable to increase the arm tension for general use.

The foregoing and other objects will manifest themselves as this description progresses, reference being had to the accompanying drawing, wherein Fig. 1 is a fragmentary perspective view of a wiper arm having the embodiment of the present invention;

Figure 1:
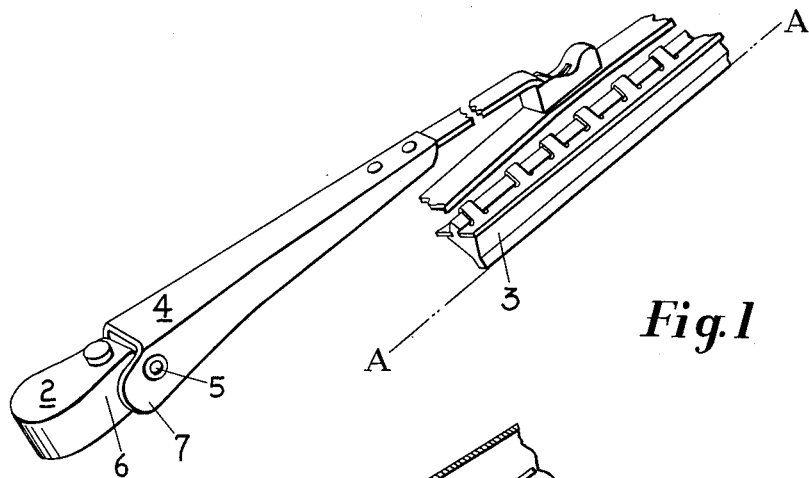

Referring more particularly to the drawing, the numeral 1 designates an oscillating shaft suitably powered and carrying on its outer end a wiper carrying arm comprising an inner or mounting section 2 and an outer section 4 to which the wiping blade 3 is connected for back and forth movement across the field of vision through the windshield A. The two arm sections are pivotally connected by a pin 5 which passes through spaced ears 6 on the mounting part 2 and through straddling ears 7 on the outer arm section 4. A coil spring 8 is disposed lengthwise within the chamber 9 of the outer arm section, the outer end of the spring being anchored to a support 10, fixed on the outer section, while the inner end of the spring is connected either directly or through a hook plate 12 to an adjustable anchor herein illustrated as a pin 11. By this arrangement the spring is supported lengthwise of the wiper arm and inwardly of the pivot 5 to act upon the outer section through an effective lever arm indicated by the broken line 13 in Fig. 5, the same being the perpendicular distance from the pivotal axis 5 to the line of spring force as indicated by the broken line 14. This effective leverage is predetermined to produce the desired normal arm pressure on the wiper 3 of approximately six or seven ounces. This normal arm pressure is best suited for general usage and with this thought in mind the rubber wiping element of the blade is designed to stand up under such pressure. A heavier pressure that will maintain the blade in wiping contact with the windshield against the lifting tendency of exceptionally strong wind currents will soon cause the rubber wiping edge to fold under or lie down upon the windshield during periods of idleness and take a set. Prior efforts to obtain heavier arm pressures have required the use of tools and this the average motorist is not inclined to do and consequently the heavier arm pressure remains in use with its detrimental effects on the wipers.

The present invention contemplates an arm structure by which a change in the arm pressure may be accomplished quickly in a simple and toolless manner, the structure affording a selectivity of definitely fixed pressures that are factory prescribed to insure the utmost service out of the wiper and its operating mechanism. According to the present invention this multi-tensioning adjustment for securing plural factory prescribed arm pressures each of a predetermined definite value is accomplished by shifting the line of spring force further away from the pivotal axis to increase the mechanical advantage through the longer lever arm indicated by the broken line 22. For this purpose, the laterally spaced ears 6 of the mounting section 2 are provided with registering pairs or series of seats 15 and 16 with a ridge 17 intervening the seats of each pair. These two seats which may be formed in a wall of a slot 18 provide bearings for selectively receiving the opposite ends of a shiftable spring anchorage 11. For normal driving this anchorage, herein shown as a pin, will be engaged in the uuper or inner seat 15 while for heavier duty the pin should be engaged in the lower or outer seat 16 to obtain the greater leverage.

Figure 2:
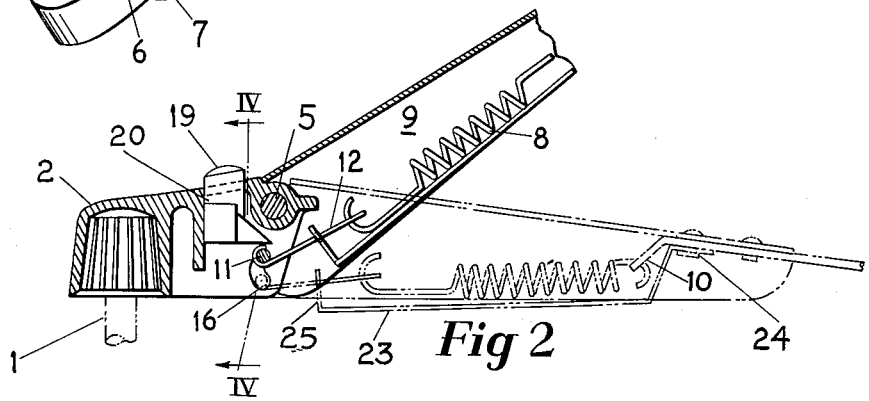
Fig. 2 is an enlarged fragmentary view in longitudinal section through the improved wiper arm showing in full line the manner of restoring the normal spring pressure to the arm from the heavy-duty adjustment indicated in broken line.
Figure 3:
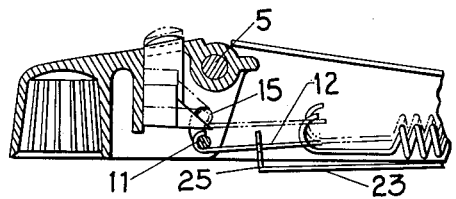
Fig. 3 is a like view showing the normal spring pressure relationship of parts in broken lines and the heavy-duty relationship in full lines.
Figure 4:
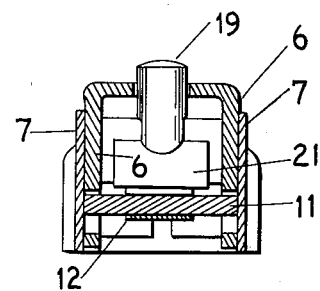
Fig. 4 is a transverse sectional view taken about on line 4—4 of Fig. 2.
Figure 5:
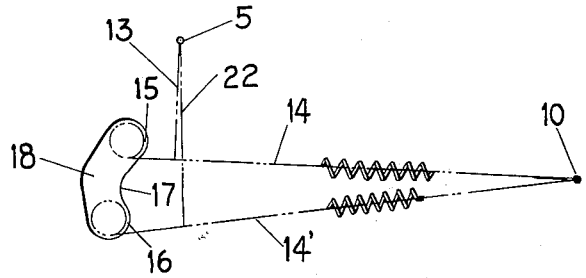
Fig. 5 is a view illustrating diagrammatically the two tension adjustments of the arm spring.

For effecting a shift of the anchoring pin 11 from the outer seat 16 to the inner seat 15, the outer arm section 4 is swung outwardly or away from the windshield to the position shown in full lines in Fig. 2. This causes the anchor pin to ride up the underside of the pin retaining ridge until it rides over the latter when it will be snapped into the inner seat 15. For effecting a reverse shifting movement of the anchor pin 11 there is provided a depressible button 19 which has a shank 20 carrying a toe 21 in overlying relation to the upwardly disposed anchoring pin 11 and which when the button is depressed will cause the anchor pin to move up the inclined face of the ridge and across the ridge 17 at which time the spring will snap the anchor pin down into its outer seat 16 and thereby increase the perpendicular distance as indicated by the line 13 to lower the line of spring force to the position indicated at 14' in Fig. 5. This will provide a definite increase in the arm pressure which may be predetermined to increase such pressure half again as much as the normal pressure, more or less. The pin will be yieldably held in either seat by the tension of the spring and with the cooperation of the retaining ridge 17. The change in the leverage will thus modify the spring action upon the arm. Should additional arm pressure be required the outer seat may be placed more nearly in radial alinement with the inner seat, as depicted in Fig. 5. This will serve to increase the tension of the spring 8.

When the motorist is contemplating a trip, as for example on a modern thruway, he will merely depress the button 19 to instantaneously provide the heavy pressure. After the trip he can restore the arm pressure to normal by simply lifting the wiper outwardly, as indicated in full lines, Fig. 2, to cause displacement of the anchoring pin from seat 16 to seat 15 to restore the normal arm pressure.

Whenever the heavier arm pressure is in use, the motorist will be apprised of the fact by a suitable indicator 23. This indicator may be connected to the link 12 by an arm 25 for being projected from the spring chamber 9 as the pin 11 is shifted to the outer seat 16. Retraction of the indicator will follow the restoration of the arm pressure to normal. The indicator may be in the form of a light stamping to serve as a cover for the spring chamber and for this purpose it is extended thereover and fixed at 24 to the arm section 4.

The foregoing description has been given in detail without thought of limitation since the inventive principles may be embodied in other physical forms without departing from the spirit of the invention and the scope of the appended claims.

What is claimed is:

1. A wiper arm for windshield cleaners comprising a mounting section and a wiper carrying section pivotally connected to the mounting section, a spring connected at its outer end to the wiper carrying section and its line of spring force extending lengthwise of the arm and transversely of the pivot axis, said mounting section having spaced ears formed with registering series of seats extending away from the pivot axis, and a spring anchoring pin connected to the inner end of the spring, the opposite ends of the pin being selectively engageable in the seats to vary the perpendicular distance between the pivot axis and the line of spring force.

2. A multi-tension wiper arm for windshield cleaners, comprising pivotally connected arm sections, a spring connected at one end to one section on a part spaced longitudinally from the pivot axis, a shiftable anchorage on the other section to which the other end of the spring is connected, the line of spring force extending lengthwise of the arm and to one side of the pivot axis, and said anchorage being shiftable from one to the other of two operative positions both laterally displaced to the same side of the pivot axis and to different perpendicular distances to selectively position the line of spring force toward or from the pivot axis in providing differing effective leverages for two predetermined arm pressures of different values, and an exposed depressible button carried by said other section and having a shank engageable with the anchorage to so shift the same.

3. A wiper arm for windshield cleaners comprising an inner mounting section and an outer wiper-carrying section pivotally connected to the mounting section for movement toward and from an associated windshield, a coil spring extending lengthwise of the arm and connected at its outer end to the outer arm section with the line of spring force extending lengthwise of the arm and offset from the pivotal axis, said mounting section having spaced ears formed with registering slots, the outer walls of which are formed with upper and lower seats, the upper seats being closer to the pivot axis than the lower seats, and a spring anchorage connected to the inner end of the spring and having selective engagement in either the upper seats or the lower seats to vary the mechanical advantage through which the spring will operate on the outer arm section.

4. A multi-tension wiper arm for windshield cleaners, comprising pivotally connected arm sections, a coil spring connected at one end to a part on one section spaced longitudinally from the pivot axis, and a shiftable anchorage on the other section to which the other end of the spring is connected, the line of spring force extending lengthwise of the arm to one side of the pivot axis, and said anchorage having two seats laterally displaced from the same side of the pivot axis different distances and a spring connected anchor selectively engageable in the seats to shift the line of spring force closer to or farther from the pivot axis, said one section being swingable to shift the line of spring force from one side to the other side of the closer seat to automatically shift the anchor thereto.

5. A multi-tension wiper arm for windshield cleaners, comprising pivotally connected arm sections, a coil spring connected at one end to a part on one section spaced longitudinally therealong from the pivot axis, a shiftable anchor on the other section to which the other end of the spring is connected, the line of spring force extending lengthwise of the arm to one side of the pivot axis, said other section having two seats laterally displaced from the same side of the pivot axis relatively different distances, said anchor being shiftable transversely of the line of spring force from one to the other seat to selectively position the line of spring force closer to or farther from the pivot axis, said one section being swingable to shift the line of spring force to a position for effecting the shift of the anchor in one direction automatically, and manual means operable to accomplish the anchor shift in the opposite direction, the spring acting in both positions of the anchor to yieldably hold the latter in its respective seat and to permit the shifting of the anchor from one seat to the other against a relatively greater spring urge.

6. A wiper arm for windshield cleaners comprising an inner mounting section and an outer wiper-carrying section pivotally connected to the mounting section for movement toward and from an associated windshield, a coil spring extending lengthwise of the arm and connected at its outer end to the outer arm section with the line of spring force extending lengthwise of the arm and offset from the pivotal axis, said mounting section having spaced ears formed with registering slots, the outer walls of which are formed with upper and lower seats, the upper seats being closer to the pivot axis than the lower seats, and a spring anchorage connected to the inner end of the spring and having selective engagement in either the upper seats or the lower seats to vary the mechanical advantage through which the spring will operate on the outer arm section, the lower seats being spaced a further distance than the upper seats from the point of connection to the outer arm section to increase the tension on the spring when the anchorage is engaged in the lower seats.

7. A wiper arm for windshield cleaners comprising an inner mounting section and an outer wiper-carrying section pivotally connected to the mounting section for movement toward and from an associated windshield, a coil spring extending lengthwise of the arm and connected at its outer end to the outer arm section with the line of spring force extending lengthwise of the arm and offset from the pivotal axis, said mounting section having spaced ears formed with registering slots, the outer walls of which are formed with upper and lower seats, the upper seats being closer to the pivot axis than the lower seats, and a spring anchorage connected to the inner end of the spring and having selective engagement in either the upper seats or the lower seats to vary the mechanical advantage through which the spring will operate on the outer arm section, the upper and lower seats having a ridge therebetween to retain the engagement in either.

8. A multi-tension wiper arm for windshield cleaners, comprising pivotally connected arm sections, a spring connected at one end to one section on a part spaced longitudinally from the pivot axis, a shiftable anchorage on the other section to which the other end of the spring is connected, the line of spring force extending lengthwise of the arm and to one side of the pivot axis, and said anchorage being shiftable from one to the other of two operative positions both laterally displaced to the same side of the pivot axis and to different perpendicular distances to selectively position the line of spring force toward or from the pivot axis in providing differing effective leverages for two predetermined arm pressures of different values, and an indicator connected to the spring for being projected thereby to an operative position when the anchorage is engaged in the position of greater arm pressure.

9. A wiper arm for windshield cleaners comprising a mounting section and a wiper carrying section pivotally connected to the mounting section, a spring connected at its outer end to the wiper carrying section and its line of spring force extending lengthwise of the arm and transversely of the pivot axis, said mounting part having spaced ears formed with registering series of seats extending away from the pivot axis, a spring anchoring pin connected to the inner end of the spring, the opposite ends of the pin being selectively engageable in the seats to vary the perpendicular distance between the pivot axis and the line of spring force, said mounting section having an opening through its front face, and an actuator projecting through such opening for being depressed manually to effect such selective engagement.

10. A multi-tension wiper arm for windshield cleaners, comprising pivotally connected arm sections, a spring connected at one end to one section on a part spaced longitudinally from the pivot axis, a shiftable anchorage on the other section to which the other end of the spring is connected, the line of spring force extending lengthwise of the arm and to one side of the pivot axis, and said anchorage being shiftable from one to the other of two operative positions both laterally displaced to the same side of the pivot axis but to different perpendicular distances to selectively position the line of spring force toward or from the pivot axis in providing differing effective leverages for two predetermined arm pressures of different values, said other section having a depressible actuator projecting through an opening in its front wall for being depressed manually to effect a shift of the anchorage from one to the other of its two operative positions, said one section being liftable from its operative position to a position from which the spring force becomes effective to restore the anchorage from the other to said one of its two operative positions.

11. In a windshield wiper arm for supporting an oscillating blade, a member rigidly fixed on an oscillating shaft, a second member pivotally supported thereon for pivotal movement in and out to and from the windshield, a spring element attached to the second member with its line of force extending across said pivotal support and the other end of said spring element supported on the first named member in either of two positions, one of which brings the line of force relatively closer to the said pivotal support and the other of said positions moving the line of force farther from the said pivotal support for the purpose of producing a greater tendency to move the free end of said second member toward the windshield with greater pressure, means associated with the first named member for shifting said other end of the spring from its first named position to its second named position, and means automatic with a pivotal movement of the second member away from the windshield for effecting a shifting of said other end of the spring from its second named position to its first named position.

References Cited in the file of this patent

UNITED STATES PATENTS

| | | |
|---|---|---|
| 2,094,732 | Anderson | Oct. 5, 1937 |
| 2,136,909 | Scofield | Nov. 15, 1938 |